May 2, 1961 K. M. FEIERTAG ET AL 2,982,504
MACHINE MOUNTING ASSEMBLY
Original Filed Oct. 18, 1956
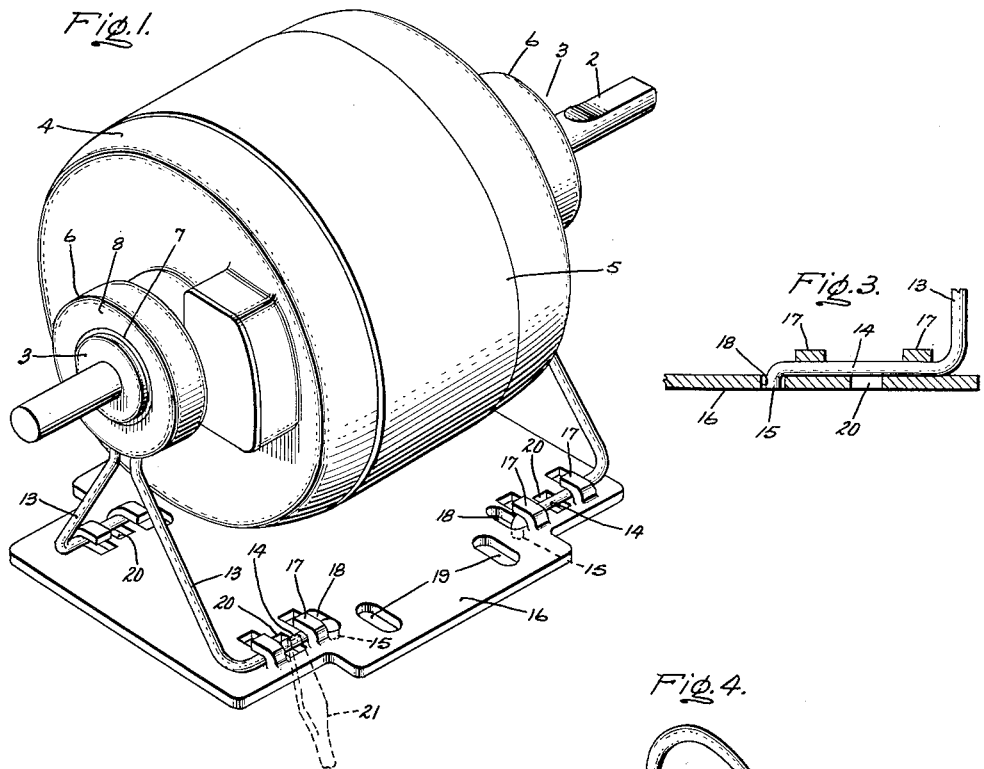
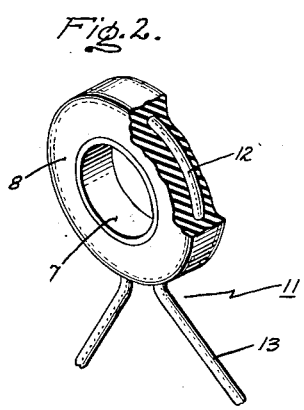
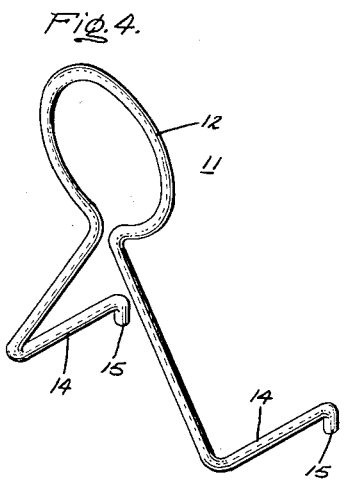
Inventors:
Karl M. Feiertag,
Lucian J. Neuls,
by John M. Stoudt
Attorney.

United States Patent Office 2,982,504
Patented May 2, 1961

2,982,504
MACHINE MOUNTING ASSEMBLY

Karl M. Feiertag and Lucian J. Neuls, Fort Wayne, Ind., assignors to General Electric Company, a corporation of New York Original application Oct. 18, 1956, Ser. No. 616,830, now Patent No. 2,957,665, dated Oct. 25, 1960. Divided and this application Dec. 21, 1959, Ser. No. 860,997

2 Claims. (Cl. 248—26)

This application is a division of our application filed October 18, 1956, Serial No. 616,830, now Patent No. 2,957,665. The present invention relates to mounting assemblies, and more particularly to in improved mounting construction especially useful in connection with small machines having rotating parts.

As the use of small machines such as electric motors increases, the necessity for dependable and secure positioning with a minimum of expense increases accordingly. While various constructions have been used in the part with reasonable success insofar as the secureness of the mounting is concerned, their cost has always been relatively high. One feature which has usually added to their expense has been the fact that a considerable number of parts was required to secure the machine to its base; such parts were of different shapes, requiring different manufacturing operations for each part and assembly of the parts into a unit to the actual securement of the machine to its base. It is most important therefore to reduce to a minimum the number of parts required for mounting a machine to a base while at the same time insuring that the parts are economical to manufacture and readily assembled to the motor and the base. It is also, of course, desirable that the mounting parts be such as to permit simplification of the base so as to permit further economies to be effected.

It is, therefore, an object of this invention to provide an improved machine mounting construction which provides a smaller number of parts of simpler manufacture than heretofore provided, which parts are readily assembled to perform their function.

A further object of the invention is to provide an improved mounting construction such as described above without any decrease in the effectiveness of the mounting insofar as positive positioning of the machine is concerned.

In one form thereof, the invention provides an improved resilient motor mounting arrangement for supporting a motor on a base in spaced relation thereto. A unitary length of stiff wire is formed with a curved portion substantially greater in arcuate length than a semi-circle molded in body of resilient material which has means for engagement with the hub of the motor. The wire is also formed with a leg portion extending radially outward from each end of the curved portion, radially beyond the motor, to the extent that a line joining them is also radially beyond the motor. The end of each leg portion is adapted to be secured to the base.

The features of the invention which are believed to be novel are set forth with particularity in the appended claims. The invention itself, however, together with further objects thereof, may best be understood by reference to the following description taken in connection with the accompanying drawing.

In the drawing;

Figure 1 is a view in perspective of a small electric motor provided with the improved mounting arrangement of the invention;

Figure 2 is a fragmentary view in perspective, partly broken away and partly in cross section showing the mounting construction of the invention;

Figure 3 is a fragmentary side view, partly in cross section, showing the securement of the member of Figure 2 to a base; and Figure 4 is a view in perspective of the stiff spring material portion of the improved mounting construction.

Referring now to the drawing, there is shown in Figure 1 a small electric motor, generally indicated at 1, having a shaft member 2 rotatably supported within hubs 3 of end shields 4 which, together with cylindrical housing member 5, form the housing for motor 1. It will be understood that while, for illustrative purposes, an electric motor is shown, the invention which is to be described is applicable to small machines in general and is not limited to motors.

In order to isolate the vibrations of a motor from its base, it is quite customary to provide about each hub of the motor, a resilient annulus which includes an inner metal ring, a rubber ring, and an outer metal ring such as disclosed in Patent 2,074,136 issued on March 16, 1937, to A. F. Welch and assigned to the assignee of this divisional application.

By the present invention, we provide an improved annulus, indicated by the numeral 6 in Figures 1 and 2 in which the motor mounting structure is formed integrally with the vibration insulating part so as to eliminate need for the outer ring and to result in an economical structure which may be quickly assembled on a motor at minimum cost. In the preferred embodiment, annulus 6 is provided with an inner ring 7 for engagement with hub 3 and a ring 8, composed of rubber (or other resilient material). A supporting member 11 formed of a length of stiff spring material such as, for instance, steel music wire, is provided with a curved portion 12 which is molded into the rubber as shown in Figure 2. It is preferable to make curved portion 12 of a length such that it extends almost completely around ring 8; however, it may extend a lesser amount so long as it is well over half of the circumference of ring 8. That is to say, curved portion 12 should have an arcuate length substantially greater than a semi-circle. At each of its ends, curved portion 12 extends into a leg portion 13. Each leg portion 13 is provided with a foot 14 terminating in a downwardly extending toe 15; leg portions 13 are preferably formed divergently in a V starting from the ends of curved portion 12 so as to have their feet 14 fairly widely separated. Legs 13 extend radially a distance such that a line joining each pair of feet 14 is radially beyond motor 1, and a plane joining all the feet 14 (where there are more than two) meets the same requirement; this ensures that the motor will be spaced from any base on which it is positioned, as further explained below.

A substantially flat base 16, which may be formed from sheet metal for instance, has a pair of tabs 17 formed therein in each corner by any suitable means such as punching. Tabs 17 are substantially in alignment with each other and with openings 18 and 20 which are also formed in base 16 adjacent each pair of tabs, as shown. Preferably, the two pairs of tabs at each end of base 16 are spaced apart a distance which is slightly less than the distance between the two feet 14 of a member 11 when legs 13 are in an unbiased position. To assemble the various parts together, with annulus 6 positioned on hub 3, feet 14 are forced toward each other until they can be inserted within the tabs 17 with each toe 15 in an opening 18 (see Figures 1 and 3). At this point, after release, the assembly is complete, with member 11 of annulus 6 holding the motor 1 to the base 16 and with feet 14 being prevented from sideways movement by the tabs 17 and from end ways movement by the toes 15. Base 16 in turn may be secured to any suitable foundation by means of suitable engaging members extending through openings 19.

When it is desired to disengage motor 1 from base 16, it is merely necessary to force legs 13 together until feet 14 are disengaged from tabs 17. This may be very conveniently effected by inserting a screw driver 21 into the opening 20 to force the foot 14 inwardly sufficiently so that it will clear the tabs 17.

It will be seen from the foregoing that the invention provides an improved machine mounting assembly wherein an integral structure cooperates with the motor at each end thereof and with the base in order to maintain the motor securely positioned on the base in a particular spaced relation thereto. It will further be seen that the construction, besides being completely effective for the desired purpose, is one which is highly economical since it involves a relatively simple structure which may be formed from inexpensive material. It will further be observed that the construction permits the elimination of special vertical flanges on the motor base such as have been commonly used heretofore in connection with such types of machines. This permits a considerable savings in material to be effected; in addition, it actually strengthens the construction since the base which results from the provision of a vertical flange at each end of the horizontal portion naturally has the weaknesses inherent in a U-shaped structure. Also, in cases where the ventilation of the motor or the machine is effected through the end thereof, the previous construction has blocked off a considerable area of the end shield as opposed to the present construction.

While this invention has been explained by describing a particular embodiment thereof, it will be apparent that improvements and modifications may be made without departing from the scope of the invention as defined in the appended claims.

What we claim as new and desire to secure by Letters Patent of the United States is:

1. A resilient motor mounting for supporting an electric motor in spaced relation on a base comprising a unitary length of stiff wire having a curved portion of greater arcuate length than a semi-circle and having a leg portion extending radially outward from each end of said curved portion, and a body of resilient material molded to said curved portion, said resilient body extending radially inward from said curved portion and having means for engagement with the hub of said motor, the end of each leg portion constructed so as to be secured to the base.

2. A resilient motor annulus for supporting an electric motor in spaced relation on a base comprising a resilient ring, an inner metal ring bonded to said resilient ring for engagement with the hub of said motor, and a unitary length of stiff wire having a curved portion substantially greater in arcuate length than a semi-circle molded within said resilient ring radially outward from said metal ring and having a leg portion extending radially outward from each end of said curved portion and projecting beyond said motor to the extent that a plane joining the leg portions is radially beyond the motor, the end of each leg portion having means for securement to the base.

References Cited in the file of this patent
UNITED STATES PATENTS

| | | |
|---|---|---|
| 2,291,148 | Carson | July 28, 1942 |
| 2,842,218 | Bradbury | July 8, 1958 |
| 2,908,457 | Loftis | Oct. 13, 1959 |